US011811983B2

(12) United States Patent
Clark

(10) Patent No.: US 11,811,983 B2
(45) Date of Patent: Nov. 7, 2023

(54) METHODS AND SYSTEM FOR IMAGING OF MOVING PRINTED MATERIALS BY AN OPTICAL DEVICE HAVING PLURALITY OF CAMERAS ARRANGED IN AN ARRAY

(71) Applicant: SYS-TECH SOLUTIONS, INC., Princeton, NJ (US)

(72) Inventor: Lee M. Clark, Ewing, NJ (US)

(73) Assignee: SYS-TECH SOLUTIONS, INC., Princeton, NJ (US)

( * ) Notice: Subject to any disclaimer, the term of this patent is extended or adjusted under 35 U.S.C. 154(b) by 0 days.

(21) Appl. No.: 18/010,565

(22) PCT Filed: Jun. 16, 2021

(86) PCT No.: PCT/US2021/037629
§ 371 (c)(1),
(2) Date: Dec. 15, 2022

(87) PCT Pub. No.: WO2021/257704
PCT Pub. Date: Dec. 23, 2021

(65) Prior Publication Data
US 2023/0231955 A1 Jul. 20, 2023

Related U.S. Application Data

(60) Provisional application No. 63/040,898, filed on Jun. 18, 2020.

(51) Int. Cl.
*H04N 1/00* (2006.01)
*H04N 1/028* (2006.01)
(Continued)

(52) U.S. Cl.
CPC ..... *H04N 1/00251* (2013.01); *H04N 1/00209* (2013.01); *H04N 1/00328* (2013.01);
(Continued)

(58) Field of Classification Search
None
See application file for complete search history.

(56) References Cited

U.S. PATENT DOCUMENTS 7,889,381 B2 * 2/2011 Suzuki ............... H04N 1/00249
358/1.18
2008/0008381 A1 * 1/2008 Ushio ....................... G06T 7/74
382/153

(Continued)

OTHER PUBLICATIONS

International Search Report and Written Opinion issued in PCT Patent Application No. PCT/US2021/037629, dated Sep. 24, 2021, 11 pages.

*Primary Examiner* — Haris Sabah
(74) *Attorney, Agent, or Firm* — Faegre Drinker Biddle & Reath LLP

(57) ABSTRACT

A system for capturing images during production of printed material includes an optical device comprising a plurality of cameras arranged in an array with adjacent pairs of cameras having overlapping fields of view. An imaging controller device determines a layout of content on printed material, and determines, based on the layout, an optical system configuration profile. Determining the optical system configuration profile includes selecting one or more cameras for capturing images of regions of interest on the printed material and determining a trigger interval for triggering the selected one or more cameras. The imaging controller device triggers the selected cameras at times determined based on the trigger interval to capture images of the regions of interest on the printed material as the printed material moves in fields of view of the one or more cameras during production of the printed material.

20 Claims, 9 Drawing Sheets

(51) Int. Cl.
 *G06V 30/146* (2022.01)
 *G06F 3/12* (2006.01)
 *G06K 15/02* (2006.01)

(52) U.S. Cl.
 CPC ..... *H04N 1/00358* (2013.01); *H04N 1/00501* (2013.01); *H04N 1/00734* (2013.01); *H04N 1/02815* (2013.01); *G06F 3/1243* (2013.01); *G06K 15/1885* (2013.01); *G06V 30/147* (2022.01); *H04N 1/00135* (2013.01)

(56) References Cited

U.S. PATENT DOCUMENTS

| | | | |
|---|---|---|---|
| 2009/0021798 A1* | 1/2009 | Abahri | H04N 1/19594 |
| | | | 358/474 |
| 2009/0098908 A1 | 4/2009 | Sliverbrook et al. | |
| 2012/0169842 A1 | 7/2012 | Chuang et al. | |
| 2015/0237233 A1* | 8/2015 | Furuki | H04N 1/40062 |
| | | | 358/474 |
| 2018/0272694 A1 | 9/2018 | Gohda et al. | |
| 2019/0258225 A1 | 8/2019 | Link et al. | |
| 2020/0223641 A1* | 7/2020 | Shin | B61L 23/041 |

\* cited by examiner

FIG. 3

METHODS AND SYSTEM FOR IMAGING OF MOVING PRINTED MATERIALS BY AN OPTICAL DEVICE HAVING PLURALITY OF CAMERAS ARRANGED IN AN ARRAY

FIELD OF TECHNOLOGY

The present disclosure is related generally to imaging technology and, more particularly, to printed material imaging applications.

BACKGROUND

Counterfeit products are, unfortunately, widely available and often hard to spot. When counterfeiters produce fake goods, they typically copy the labeling and barcodes in addition to the actual products. At a superficial level, the labels and barcodes may appear genuine and even yield valid data when scanned (e.g., decode to the appropriate code, such as European Article Number (EAN), Universal Product Code (UPC), Interleaved Two of Five (ITF) code, Quick Response (QR) code, etc.). While there are many technologies currently available to counter such copying, most of these solutions involve the insertion of various types of codes, patterns, microfibers, microdots, and other indicia to help thwart counterfeiting. Such techniques require manufacturers to use additional equipment and material and add a layer of complexity to the production process. Alternatively, some systems may extract information from labels or barcodes that are known to be genuine, for example by processing images of labels or barcodes that are known to be genuine, and may subsequently use this information to authenticate products bearing presumably the same labels or barcodes.

Optical systems sometimes are utilized to obtain images of moving material, for example for quality inspection and defect detection during production of the material and/or to extract useful information from images of the printed materials. Such systems often use line scan technology to obtain images of the moving material. Line scan technology requires accurate tracking of motion of the printed material to obtain images with sufficiently high resolutions, which may not be feasible in high speed image acquisition applications. Line scan systems may also be physically too large to fit in tight areas that may be available for optical systems at sites manufacturing the materials.

SUMMARY

In an embodiment, a system for capturing images during production of printed material comprises an optical device comprising a plurality of cameras arranged in an array, wherein adjacent pairs of cameras in the array have overlapping fields of view. The system also comprises an imaging controller device configured to determine a layout of content on printed material, and determine, based on the layout of content on the printed material, an optical system configuration profile. Determining the optical system configuration profile includes i) selecting one or more cameras, among the plurality of cameras, for capturing images of one or more regions of interest on the printed material, the one or more cameras being selected such that each region of interest among the one or more regions of interest fits, in its entirety, in a field of view of a particular camera among the one or more cameras, and ii) determining a trigger interval for triggering the selected one or more cameras. The imaging controller device is further configured to trigger the selected one or more cameras at times determined based on the trigger interval to capture images of the one or more regions of interest on the printed material as the printed material moves in fields of view of the one or more cameras during production of the printed material.

In another embodiment, a method for capturing images of printed material by an optical device equipped with a plurality of cameras arranged in an array, wherein adjacent pairs of cameras in the array have overlapping fields of view. The method includes determining, with a processor of an imaging controller device, a layout of content on printed material. The method also includes determining, with the processor of the imaging controller device based on the layout of content on the printed material, an optical system configuration profile, including i) selecting one or more cameras, among the plurality of cameras, for capturing images of one or more regions of interest on the printed material, the one or more cameras being selected such that each region of interest among the one or more regions of interest fits, in its entirety, in a field of view of a particular camera among the one or more cameras, and ii) determining a trigger interval for triggering the selected one or more cameras. The method additionally includes triggering, with the imaging controller device, the selected one or more cameras at times determined based on the trigger interval to capture images of the one or more regions of interest on the printed material as the printed material moves in fields of view of the one or more cameras during production of the printed material.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

FIG. 3 is a diagram of an example user interface that may be utilized to provide information descriptive of the layout of content on printed material, according to an embodiment.

DETAILED DESCRIPTION

Figure 1:
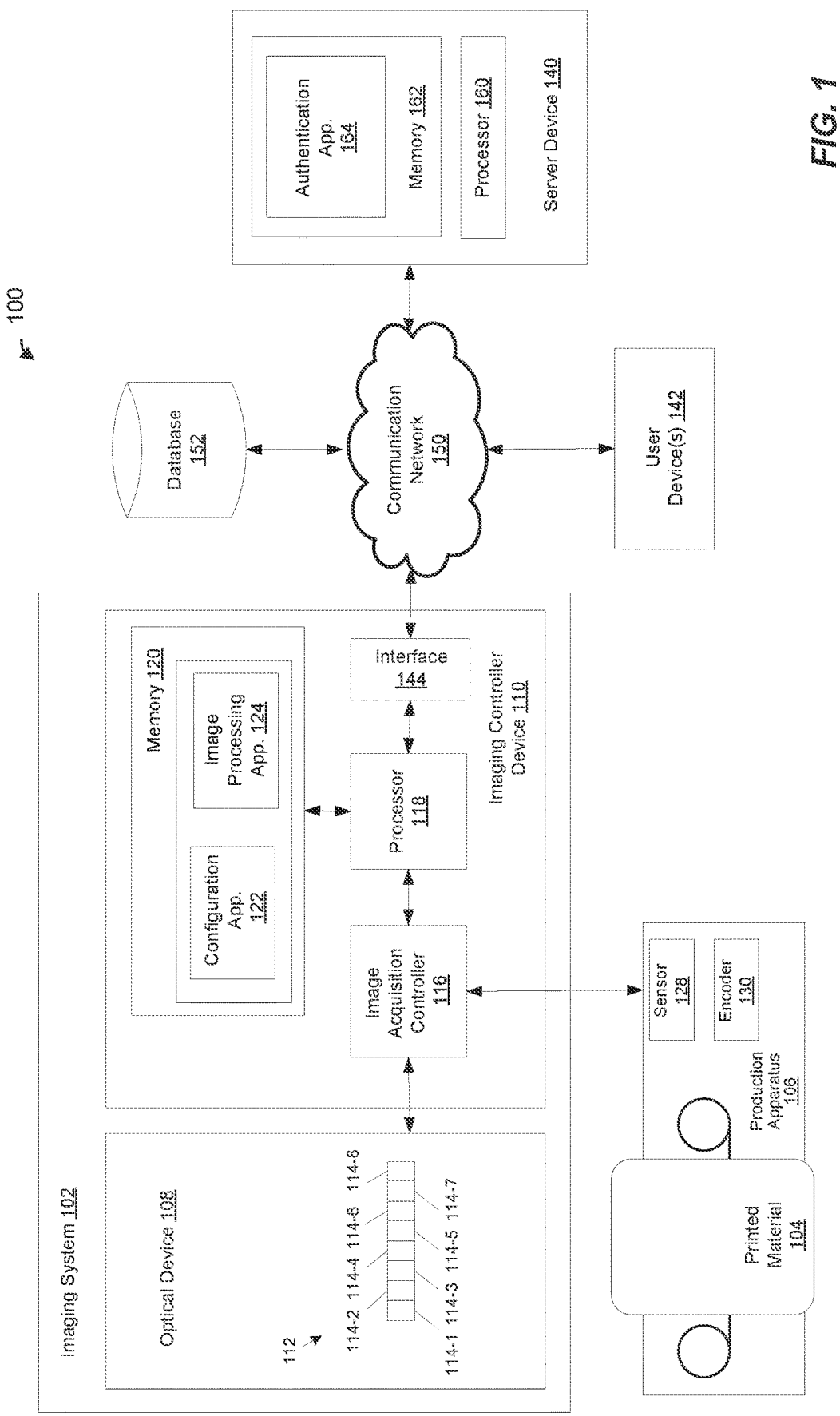
FIG. 1 is a block diagram of an example system in which an imaging system may be used to capture and process images of regions of interest in moving printed material, according to an embodiment.

In embodiments described below, an imaging system is utilized to acquire and process images of regions of interest on printed materials during production runs performed in producing the printed materials. For example, as described in more detail below, the imaging system may acquire images of marks on labels during production of the labels, and may process the images of the marks to generate identifiable electronic signatures ("signatures") that may subsequently be utilized for authentication of products presumably bearing the genuine marks. However, the imaging system is generally described herein in the context of printed labels, and generation of signatures for marks on the printed labels, merely for exemplary purposes. In other embodiments, the imaging system may be utilized in other manufacturing application. For example, the imaging system may be utilized for detection of defects in printed materials, or for acquiring and processing images of materials other than printed materials.

The imaging system may include an optical device comprising an imaging array having a plurality of area scan cameras. The imaging array me be arranged such that respective cameras in the array have overlapping fields of view. The optical device may be installed at a manufacturing site that may utilize a production apparatus to produce printed material, such as a label manufacturer that may utilize label printers, label converters, slitters, rewinders, and the like, to produce reels of printed labels, for example. The imaging system may also include a controller device configured to control operation of the optical device during a production run that may be performed by the production apparatus. The controller device may determine a layout of content on the printed material, such as a layout of a web of labels that may be printed on the printed material. Based on the determined layout of content on the printed material, the controller device may generate an optical system configuration profile to be used to control the optical device during the production run performed by the production apparatus in manufacturing of the printed material. For example, the controller device may determine locations of regions of interest on the printed materials, and may select one or more cameras in the imaging array to be used for capturing images of the regions of interest on the printed material. The one or more regions of interest on the printed material may include marks, such as barcodes, 2-D codes (e.g., QR codes), logos, etc., that may be printed on labels, for example. The controller device may also determine a trigger interval for triggering the selected one or more cameras such that the selected cameras are triggered at appropriate times as the printed material moves through cameras' fields of view during production of the printed material to accurately capture images of regions of interest on the printed material.

In operation, as the printed material moves through the fields of view of the cameras during production of the printed material, the controller device may trigger the selected one or more cameras at times at which the one or more regions of interest on the printed material are aligned with the fields of view of the selected cameras. The controller device may be guided by sensor and encoder signals that the controller device may receive from the production apparatus to detect reference points on the printed material and a distance of travel of the printed material to ensure that the images are captured at precise times when the regions of interest are aligned with the fields of view of the cameras, in some embodiments.

The imaging system may process the acquired images, for example to extract signature information from marks that may be depicted in the images. To allow the imaging system to quickly process large volumes of images that may be acquired by the imaging system during the production run, the imaging system may be equipped with a multi-core processor and/or may utilize multi-threading techniques to process the images. In an embodiment, the imaging system may include an interface communicatively coupled to a network, and may be configured to communicate with other devices via the network. For example, upon processing the acquired images, the imaging system may transmit the acquired images and/or information extracted from the acquired images, via the network, to a database and/or to a server device, where the acquired images and/or information extracted from the acquired images may be stored and subsequently utilized for authentication of products presumably bearing the marks that are depicted in the images.

By triggering the selected cameras at the appropriate times determined based on the trigger interval, the imaging system may acquire images of the regions of interest with a suitably short camera exposures that may be needed to prevent or minimize motion blur from images, particularly in applications with high speed moving printed materials, and to acquire sufficiently clear images that allow extraction of signatures from the images of the regions of interest and/or accurate inspection of the printed materials in the regions of interest. Further, providing cameras with overlapping fields of view, and selecting appropriate cameras for capturing of the images such that each region of interest is captured by a single camera in a single image, allows for fast and efficient processing of the images which, in turn, allows the imaging system to quickly and efficiently process a large volume of images that may be acquired during the production run, in at least some embodiments.

FIG. 1 is a block diagram of an example system 100 in which an imaging system 102 may operate to acquire and process images of regions of interest in printed material 104 produced by a production apparatus 106, according to an embodiment. The production apparatus 106 may be a printer, a label converter, a slitter, a rewinder, or any other equipment that may be used in producing the printed material 104. The printed material 104 may be a label web, for example, or may be any other suitable type of printed material. Regions of interest on the printed material 104 may include marks that may be printed on labels, for example. A mark may be something that identifies a brand (e.g., a logo), something that bears information, such as a barcode (e.g., a one-dimensional ("1D") barcode, such as such as European Article Number (EAN), Universal Product Code (UPC), Interleaved Two of Five (ITF) code, etc., a two-dimensional ("2D") data matrix barcode as specified in the International Organization for Standardization ("ISO") and the International Electrotechnical Commission ("IEC") standard ISO/IEC 16022, a Quick Response (QR) code, etc.), an expiration date, or tracking information such as a serial number), or a decoration. In other embodiments, the printed material 104 may include other suitable regions of interest.

The imaging system 102 may include an optical device 108 and an imaging controller device 110. Although the imaging controller device 110 is illustrated in FIG. 1 as being separate from, and external to, the optical device 108, the imaging controller device 110 may be integrated with the optical device 108 in other embodiments. The optical device 108 may be equipped with an imaging array 112 having a plurality of imaging sensors (e.g., cameras) 114. The optical device 108 may be positioned in the vicinity of (e.g., above) the production apparatus 106 such that the printed material 104 moves through fields of view of the cameras 114 during a production run that may be performed by the production apparatus 106 in producing the printed material 104.

The imaging array 112 may include a linear arrangement of eight cameras 114. In other embodiments, the imaging array 112 may include other suitable numbers of cameras 114 and/or the cameras 114 may be arranged in suitable non-linear arrangements. The cameras 114 may be area scan cameras configured to capture an image containing a two dimensional (2D) pixel matrix in a single exposure cycle. Multiple ones of the cameras 114 may operate in parallel to capture images of wider printed materials as compared to systems where only a single area scan camera is utilized, in at least some embodiments. The cameras 114 may comprise imaging sensors of relatively high resolution, such as 20 μm/pixel or higher resolution, in an embodiment. As an example, VCXU-123M model cameras manufactured by Baumer may be utilized as the cameras 114. In other embodiments, other suitable area scan cameras and/or cameras with other suitable resolutions may be utilized as the cameras 114. The cameras 114 may be arranged such that respective cameras 114 have overlapping fields of view. For example, a field of view of the camera 114-2 may overlap with respective fields of view of the camera 114-1 and 114-3, the field of view of the camera 114-3 may overlap with respective fields of view of cameras 114-2 and 114-4, and so on, in an embodiment. Degrees of overlap between the respective fields of view of the cameras 114 may vary in various embodiments. For example a 50% overlap may be utilized, in an embodiments. In other embodiments, other suitable degrees of overlap (e.g., 25%, 75%, 100%, 125%, 150%, etc.) may be utilized.

The imaging controller device 110 may include an image acquisition controller 116, a processor 118 and a computer readable memory 120 that stores computer readable instructions executable by processor 118. The computer readable memory 120 may include volatile memory to store computer instructions, such as Random Access Memory (RAM), and may also include persistent memory such as, for example, a hard disk, hard-drive or any other stable storage space, e.g. a secure digital ("SD") card, a flash drive, etc., in various embodiments. The computer readable memory 120 may store a configuration application 122 and an image processing application 124. Although the imaging controller device 110 is illustrated in FIG. 1 as including a single processor 118, the imaging controller device 110 may include multiple processors 118 in some embodiments. In some embodiments, the one or multiple processors 118 may be multi-core processors and/or may utilize multi-threading to perform processing operations. For example, the processor 118 may comprise 12 cores, 16 cores, 64 cores, or any other suitable number of cores. Further, in some embodiments, the configuration application 122 and/or the image processing application 124 may be implemented using hardware components, firmware components, software components, or any combination thereof.

The configuration application 122 may obtain information descriptive of specific layout of content on the printed material 104, and may determine an optical system configuration profile based on the specific layout of content on the printed material 104. As an example, in an embodiment in which the printed material is a label web sheet, the configuration application 122 may obtain information that indicates a width of the label web sheet, a number of lanes of labels that may run across the width of the label web sheet, a height and width of each label on the label web sheet, a distance between adjacent labels on the web sheet, and a location and size of a region of interest, such as a barcode, in each label on the label web sheet, and the like. In an embodiment, the configuration application 122 may determine the specific layout of the content on the printed material 104 based on user input. For example, the configuration application 122 may provide a user interface that may request information descriptive of the specific layout of the content on the printed material 104. Additionally or alternatively, the imaging controller device 110 may determine the specific layout of content on the printed material 104 by applying suitable image processing techniques to one or more sample images that may depict the content of the printed material 104. The one or more sample images may be obtained by the imaging controller device 110 by suitably controlling operation of the optical device 108 during a production run (e.g., during a sample production run or during an initial stage of a real production run) that may be performed by the production apparatus 106 in producing the printed material 104. As just an example, the imaging controller device 110 may trigger particular cameras 114 (e.g., all cameras 114 or particular subset or subsets of cameras 114) at one or more sample trigger intervals as the printed material 104 moves in the fields of view of the cameras 114 during the production run. The imaging controller device 110 may process images captured by the particular cameras 114 triggered during the production run to determine the layout of content on the printed material 104, in an embodiment. In other embodiments, the imaging controller device 110 may obtain the one or more sample images of the content on the printed material 104 in other suitable manners and/or may determine the specific layout of content on the printed material 104 using suitable techniques other than processing sample images of the content on the printed material 104 obtained during a production run performed by the production apparatus 106.

Based on the information descriptive of the specific layout of content on the printed material 104, the configuration application 122 may determine an optical system configuration profile to be used for controlling the optical device 108 during production of the printed material 104 by the production apparatus 106. Determining the optical system configuration may include selecting, based on the layout of the content on the printed material 104, one or more cameras 114 to be triggered to obtain images of the regions of interest during movement of the printed material 104 as the printed material 104 is produced or processed by the production apparatus 106. In an embodiment, for each region of interest across a width of the printed material 104, such as for each barcode (or a respective portion of each barcode) across a width of a label web sheet, the configuration application 122 selects a particular camera 114 that will have the region of interest, in its entirety, in its field of view during movement of the printed material 104 through its field of view. Such camera selection ensures that appropriate cameras 114 are triggered during production of the printed material 104 so that one or more particular regions of interest (e.g., one or more barcodes) are captured, in their entireties, in a single image by a single camera 114, in an embodiment. Ensuring that each region of interest on the printed material 104 is captured, in its entirety, in a single image facilitates processing of the images because the images can be processed independently of each other to extract useful information from the region of interest captured in each image, in at least some embodiments.

Arranging cameras 114 in an array with adjacent cameras 114 having overlapping fields of view ensures that for various layout of content of printed material 104, such as various layouts of labels and various locations and sizes of regions of interest within the labels on the printed material 104, a single camera 114 can be selected to capture each region of interest in its entirety, ensuring that a single image will entirely contain the region of interest, in at least some embodiments. In some situations, for certain layouts of content on the printed material 104, multiple cameras 114 among the plurality of cameras 114 may be available to capture a region of interest in its entirety as the printed material 104 moves through the fields of view of the camera 114. For example, due of the overlap in the fields of view of multiple cameras 114, each of the multiple cameras 114 may have a region of interest, in its entirety, in its field of view as the printed material 104 moves through the fields of view of the multiple cameras 114. In this case, the configuration application 122 may select one of the multiple available cameras 114 to be used for capturing the region of interest during the production process as the printed material 104 moves through the field of view of the selected camera 114. In an embodiment, the configuration application 120 may select a particular camera 114 among the multiple available cameras 114 based on respective locations of the region of interest within the fields of view of the multiple available cameras 114. For example, the configuration application 120 may select a particular camera 114 for which the region of interest is closest to the center of its field of view. In other embodiments, the configuration application 120 may utilize different selection criteria to select a particular camera 114 among the multiple available cameras 114. For example, a user may use a user interface to specify cameras 114 to be selected, in an embodiment.

Determining the optical system configuration profile may additionally include determining a trigger interval to be used for triggering the selected cameras 114 during the production run on the production apparatus 106. The configuration application 122 may determine, for example, a timing or a distance interval with respect to specific reference lines that may run across the width of the printed material 104. As an example, if the regions of interest correspond to barcodes on labels, the configuration application 122 may determine a distance interval from a beginning of a row of labels, along a perpendicular line, to a center of the barcode. As another example, the configuration application 122 may determine, based on expected speed of movement of the printed material, a time interval for the printed material to travel from a beginning of a row of labels, along a perpendicular line, to a center of the barcode.

The image acquisition controller 116 may utilize the optical system configuration profile determined by the configuration application 122 to control operation of the optical device 108 during a production run performed by the production apparatus 106. In some embodiments, the configuration application 122 may store the determined optical system configuration profile in an optical system configuration profile memory (not shown in FIG. 1) that may store respective optical system configuration profiles determined for different layouts of the printed material 104 that the production apparatus 106 may be configured to produce in different production runs, or as parts of a same production run. The imaging controller device 110 may be configured to retrieve, from the optical system configuration profile memory, appropriate optical system configuration profiles to be used to control operation of the optical device 108 during particular production runs performed by the production apparatus 106. For example, a user may specify, via a user interface, which particular optical system configuration profile is to be retrieved from the memory for particular production run. As an example, the user may utilize the user interface to select, or otherwise specify, a particular job (e.g., a particular print job) to be performed by the production apparatus 106 during the production run, where the particular job is associated with a particular layout of content on the printed material 104. In another embodiment, the imaging controller device 110 (e.g., the image acquisition controller 116 or another component of the imaging controller device 110) may detect the particular layout of content on the printed material 104 to be produced during a production run based on information that the imaging controller device may receive from production apparatus 106. For example, the image acquisition controller 116 may detect the particular layout of content on the printed material 104 based on receiving, from the production apparatus 106, a signal (e.g., an Ethernet internet protocol (IP) command or another suitable signal) indicating that a particular production run associated with a particular layout of content on the printed material 104 that is to be produced by the production apparatus 106. In yet another embodiment, the imaging controller device 110 may detect the particular layout of content on the printed material 104 by processing a code, such as a QR code or another suitable code, that may be printed on an area in the printed material 104 (e.g., on a side of a label web printed on the printed material 104). The code that may be printed on an area in the printed material 104 may indicate a particular production run (e.g., a particular print job) that may be associated with a particular layout of content on the printed material 104 that is to be produced by the production apparatus 106. For example, a camera 114 of the imaging array 112 may be used to capture images of the area on the printed material 104 during an initial stage of a production run to be performed by the production apparatus 106. As another example, a camera (not shown in FIG. 1) separate from the imaging array 112 may be provided to capture images of the area on the printed material 104 during an initial stage of a production run to be performed by the production apparatus 106. One or more images captured by the camera 114 of the imaging array 112 or by the camera separate from the imaging array 112 may be processed by the imaging controller device 110 to detect and decode the code that may be printed on the area of the printed material 104. The imaging controller device 110 may then retrieve, from the optical system configuration profile memory based on the information indicated by the code, an appropriate optical system configuration profile to be used to control operation of the optical device 108 during the production run.

In some embodiments and/or scenarios, the imaging controller device 110 may retrieve appropriate optical system configuration profiles from the optical system configuration profile memory dynamically during operation of the production apparatus 106, for example in scenarios in which a layout of the content on the printed material 104 may dynamically change during the production run performed by the production apparatus 106. In an embodiment, the imaging controller device 110 (e.g., the image acquisition controller 116 or another component of the imaging controller device 110) may detect particular layouts of content on the printed material 104 at particular times during the production run, for example based on receiving, from the production apparatus 106, signals (e.g., an Ethernet internet protocol (IP) command or another suitable signals) indicating a change to a new layout of content on the printed material 104 during the production run. As another example, the printed material 104 may include a code, such as a QR code or another suitable code, that may be printed on an area of the printed material 104 (e.g., on a side of a label web printed on the printed material 104) as described above, immediately preceding or concurrently with a change to a new layout of content on the printed material 104. The imaging controller device 110 may process one or more images of the area on the printed material 104 that may be captured by a camera 114 of the imaging array 112 or by a camera spate from the imaging array 112 as described above to detect the switch to the new layout on the printed material 104. By detecting particular layouts of content on the printed material 104 at particular times during the production run, the imaging controller device 110 (e.g., the image acquisition controller 116 or another component of the imaging controller device 110) may determine which particular optical system configuration profiles are to be retrieved from the optical system configuration profile memory "on the fly" during a production run, and may retrieve the system configuration profiles to be used to control operation of the optical device 108 at the appropriate times during the production run that produces printed material 104.

Based on the optical system configuration profile, the image acquisition controller 116 may trigger the one or more cameras 114 selected by the configuration application 122 at times that may be determined by the trigger interval determined by the configuration application 122 so that the selected cameras 114 are triggered at appropriate times to capture images of the regions of interest on the printed material 104 during movement of the printed material 104 through the fields of view of the selected one or more cameras 114. In some embodiments, the optical device 108 may also include one or more light sources (not shown in FIG. 1), which may be high intensity light emitting devices, such as light emitting diodes (LEDs), for example. In such embodiments, the image acquisition controller 116 may trigger the light sources of the optical device 108 at least substantially simultaneously with triggering the cameras 114 of the optical device 108 to provide short, high intensity, flashes of light during capture of images by the cameras 114 in order to obtain sufficiently clear images of the regions of interest on the printed material 104, for example.

The production apparatus 106 may be equipped with a sensor 128 and an encoder 130. The sensor 128 may be configured to detect certain points of reference on the printed material 104 as the printed material 104 moves during operation of the production apparatus 106, and to generate sensor signals indicating the points of reference on the printed material 104. The encoder 130 may track motion of the printed material 104, and to generate encoder signals that indicate the movement of the printed material 104. The image acquisition controller 116 may receive sensor signals generated by the sensor 128 and encoder signals generated by the encoder 130 during operation of the production apparatus 106, and may be guided by the signals to implement precise triggering of the selected cameras 114 based on the triggering interval determined by the configuration application 122. As an example, the sensor 128 may detect a label edge in a row of labels, and the sensor signal provided to the image acquisition controller 116 may indicate that a label edge of a row of labels has passed a reference point. The encoder signal provided to the image acquisition controller 116 by the encoder 130 may, in turn, indicate a distance that the printed material 104 has traveled from the reference point. Based on the sensor signal provided by the sensor 128 and the encoder signal provided by the encoder 130, the image acquisition controller 116 may trigger the cameras 114 at a point when the printed material 104 has progressed from the reference point by a distance (or time) that corresponds to the trigger interval determined by the configuration application 122. Once triggered, the selected cameras 114 may, in parallel, capture images of the regions of interest on each label in the row of labels. This process may be repeated as each row of labels on the printed material 104 passes the reference point by a distance (or time) that corresponds to the trigger interval determined by the configuration application 122.

By triggering the selected cameras 114 at the appropriate times determined based on the trigger interval, the image acquisition controller 116 may acquire images of the regions of interest on the printed material 104 with suitably short camera exposures (e.g., 5 µs exposure times or other suitable short exposure times) that may be needed to prevent or minimize motion blur from the images, for example in application with high speed moving printed materials (e.g., moving at 2 m/sec or moving at other relatively high speeds), and to acquire sufficiently clear images that allow extraction of signatures from the images of the regions of interest on the printed material 104.

The image acquisition controller 116 may provide the images acquired from the optical device 108 to the processor 118 for processing of the images by the processor 118. The images may be processed by the processor 118 as the images are acquired during the production run performed by the production apparatus 106, and processed images may be discarded so that new images can be acquired and processed by the processor 118, in an embodiment. The processor 118 may implement the image processing application 124 to process the images. Processing the images may include using unintentionally-produced artifacts within a mark depicted in the image to define an identifiable electronic signature ("signature") that may subsequently be used to authenticate a candidate mark that presumably corresponds to the mark depicted in the image. The term "artifact" as used herein is a feature of a mark that was produced by the machine or process that created the mark, but not by design or intention (i.e., an irregularity). Examples of artifacts include: (a) deviation in average color of a subarea (e.g., a cell of a 2D barcode) from an average derived from within the mark (which may be an average for neighboring cells of the same nominal color), (b) bias in the position of a subarea relative to a best-fit grid of neighboring subareas, (c) areas of a different one of at least two colors from a nominal color of the cells, (d) deviation from a nominal shape of a continuous edge within the mark, and (e) imperfections or other variations resulting from the mark being printed. In some embodiments, an artifact is not controllably reproducible. Processing the images may further include extracting certain features of the signature in order to enhance the ease and speed with which numerous genuine signatures can be searched and compared with signatures of candidate marks.

In some embodiments, the processor 118 utilizes multiple cores and/or implements multi-threading techniques to more quickly process the images acquired during production of the printed material 104. For example, multiple cores of the processor 118 and/or multiple threads implemented by the processor 118 may operate in parallel to perform processing of respective regions of interest on the printed material 104 captured in respective images by respective cameras 104. As an example, multiple cores of the processor 118 and/or multiple threads implemented by processor 118 may operate in parallel to process respective barcodes that may be captured, in their entireties, by respective cameras 114. Additionally or alternatively, multiple cores of the processor 118 and/or multiple threads implemented by processor 118 may operate in parallel to process portions of a single barcode that may be split into respective portions (e.g., respective halves of an EAN code that may be separated by a central guard on the EAN code) to enable parallel processing of the respective portions of the barcode. In an embodiment, the respective portions of the barcode may be captured in different images by different cameras 114 during production of the printed material 104. In another embodiment, an entire barcode captured in a single image by a single camera 114 during production of the printed material 104 may be pre-processed by the processor 118 to parse out portions of the barcode for parallel processing by multiple cores of the processor 118 and/or using multiple threads implemented by the processor 118. In an embodiment, parallel processing of the respective portions of the barcode may include generating, by respective cores and/or using multiple threads, respective signatures for the respective portions of the barcode. The respective signatures generated for the respective portions of the barcode may then be combined into a single signature corresponding to the barcode and, in some embodiments, an HID may then be generated for the single signature corresponding to the barcode.

Referring still to FIG. 1, the system 100 may include a server device 140 and/or one or more user devices 142. The imaging controller device 110 may include an interface 144 for communicatively coupling the imaging controller device 110 to the server device 140 and/or the one or more user devices 142 via a communication network 150. The communication network 150 may be a wide area network (WAN) such as the Internet, a local area network (LAN), or any other suitable type of network. The communication network 150 may be single network or may be made up of multiple different networks, in some embodiments. The system 100 may include a database 152, in some embodiments. The database 152 may be communicatively coupled to the imaging controller device 110 and/or the server device 140 via the communication network 150, as illustrated in FIG. 1, or may be directly or indirectly coupled to the imaging controller device 110 and/or the server device 140 in other suitable manners. For example, the database 152 may be directly connected to the server device 140, or may be included as part of the server device 140, in some embodiments. The database 152 may be a single database or may include multiple different databases. The user devices 142 may include, for example, personal computers, tablet computers, cellular phones, smart phones, and other suitable web-enabled devices.

The server device 140 is illustrated in FIG. 1 as including a processor 160 and a computer readable memory 162 that stores instructions executable by the processor 160. The computer readable memory 162 may store an authentication application 164. The computer readable memory 162 may include volatile memory to store computer instructions, such as Random Access Memory (RAM), and may also include persistent memory for example, a hard disk, hard-drive or any other stable storage space, e.g. a SD card, a flash drive, etc., in various embodiments. In some embodiments, the server device 140 includes multiple processors 160. Further, in some embodiments, the authentication application 164 may be implemented using hardware components, firmware components, software components, or any combination thereof. The imaging controller device 110 may be configured to transmit, via the interface 144 and the communication network 150, the images acquired from the optical device 108 and/or the signatures and/or other information extracted from the images to the server device 140 and/or the database 152. In an embodiment, the interface 144 may include a Google Remote Procedure Call (gRPC) service that may be used, for example, for transferring the images acquired from the optical device 108 and/or the signatures and/or other information extracted from the images via the communication network 150 to the server device 140 and/or the database 152. In other embodiments, other suitable interfaces may be utilized. The authentication application 164 may subsequently receive images of candidate marks that may be obtained, for example, by the user devices 142, and may determine whether the marks are genuine by generating a signature for the candidate marks, comparing the signature of the candidate mark with the signatures of the genuine marks that may be stored in the database 152, for example.

Users of the imaging system 102 may provide printed material layout information to the configuration application 122 via a user interface that may be provided to the user via a user device 142. Users of the imaging system 102 may also monitor progress of image capture and processing performed by the imaging system 102 via a monitor interface that may be provided to the user via a user device 142, in some embodiments. In some embodiments, a secure (e.g., encrypted) communication channel may be established, via the communication network 150, between a user device 142 and the imaging system 102, for example to allow the user device 142 to securely control configuration and operation of the imaging system 102. In some embodiments, a user device 142 may be used to capture images of candidate marks and, in some cases, to generate signature information for the candidate marks. The user device 142 may then transmit the captured images of the candidate marks and/or signature information extracted from the candidate marks, to the server device 140 for authentication of the candidate mark by the authentication application 164 of the server device 140.

Some example signature generation techniques (e.g., that may be implemented by the image processing application 124 of the imaging controller device 110 to extract signatures from marks captured in images, in an embodiment) and some example authentication techniques (e.g., that may be implemented by the authentication application 164 of the server device 140, in an embodiment) are described in the U.S. Pat. No. 9,940,572, issued on Apr. 10, 2018, and entitled "Methods and a Computing Device for Determining Whether a Mark is Genuine," which is hereby incorporated by reference herein in its entirety.

Figure 2:
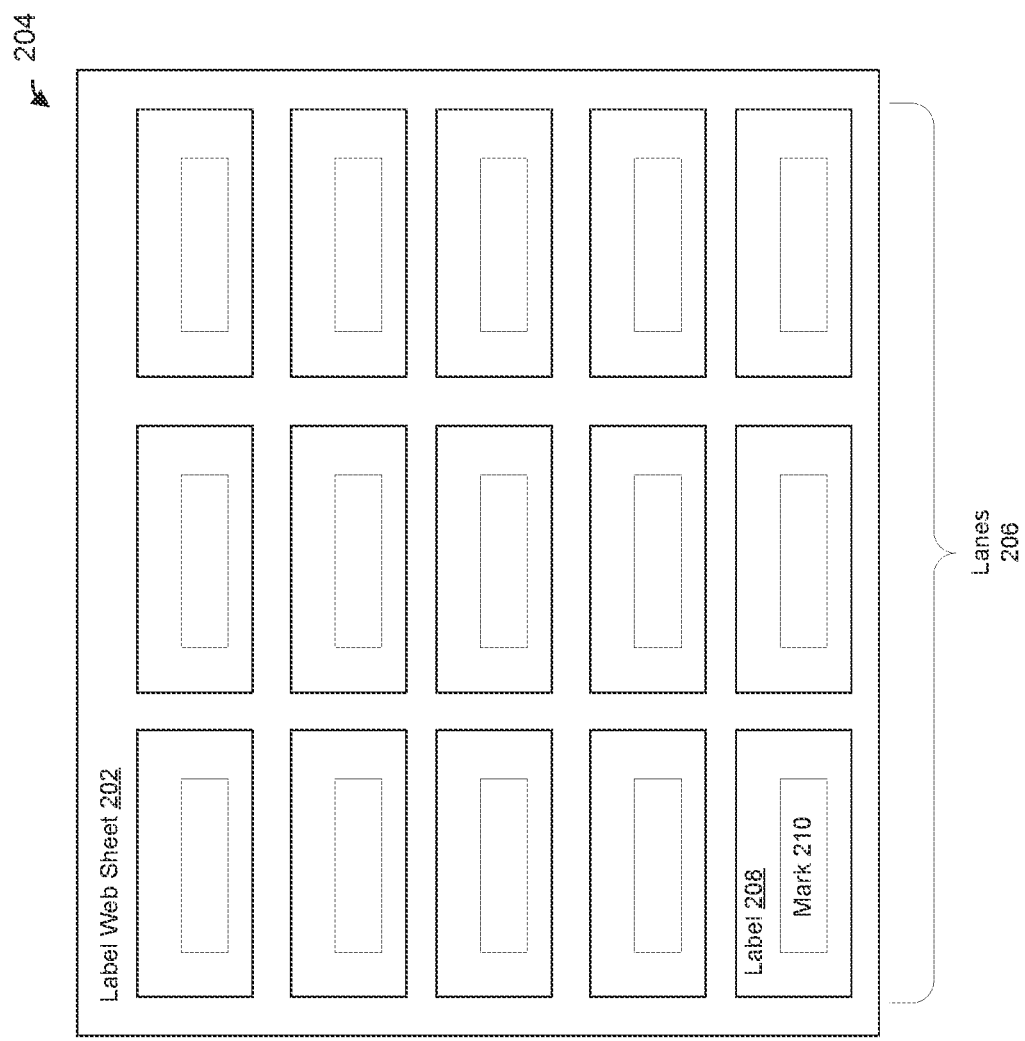
FIG. 2 is a block diagram of an example layout of content on printed material that may be imaged in the system of FIG. 1, according to an embodiment.

FIG. 2 is a block diagram of an example layout of content on printed material 204, according to an embodiment. The printed material 204 may correspond to the printed material 104 of FIG. 1, and the printed material 204 is described in the context of FIG. 1 for exemplary purposes. The printed material 204 is illustrated in FIG. 2 as comprising a label web sheet 202 having a plurality of lanes 206 that run across the direction of travel of the printed material 204 during production of the printed material 204, each lane 206 having a plurality of labels 208 that run along the direction of travel of the printed material 204 during production of the printed material 204. Each label 208 may include a mark 210. The mark 210 may be something that identifies a brand (e.g., a logo), something that bears information, such as a barcode a QR code, an expiration date, tracking information such as a serial number, etc., or a decoration.

Figure 3:
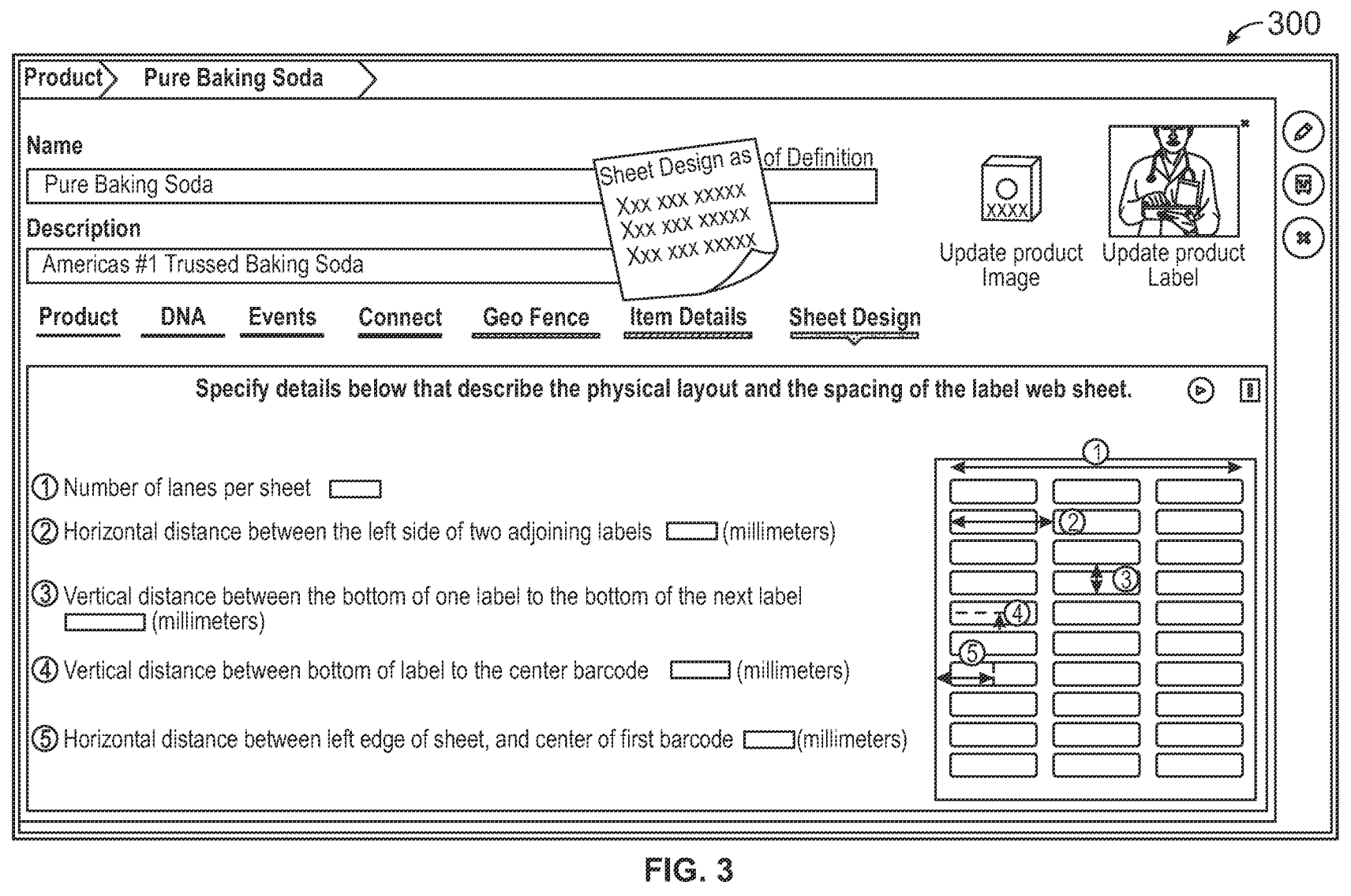

Referring now to FIGS. 1 and 2, the configuration application 122 may be configured to determine a layout of the label web sheet on the printed material 204. For example, the configuration application 122 may determine the following layout information: i) a number of lanes of labels on the web sheet, ii) a horizontal distance between corresponding left sides of two horizontally adjacent labels 208, iii) a vertical distance between corresponding bottom edges of two vertically adjacent labels, iv) a horizontal distance between a left edge of the web sheet and a center of a mark 210 in a left-most lane 206, and v) a vertical distance between a bottom edge of a label 208 and a center of a mark 210 on the label 208. Referring briefly to FIG. 3, an example user interface 300 may be provided by the imaging controller device 110 to obtain such layout information from a user. The user may enter the requested information via the user interface 300 that may be displayed to the user on a user device 142 or on a local display (not shown) that may be provided with the imaging system 102. Additionally or alternatively, the imaging controller device 110 may determine the specific layout of content on the printed material 104 by applying suitable image processing techniques to one or more sample images that may depict the content of the printed material 104. For example, the imaging controller device 110 may acquire sample images of the printed material 204 that may be captured by the cameras 114 during a production run (e.g., during a sample production run or during an initial stage of a real production run) that may be performed by the production apparatus 106. The sample images may capture the entire area of printed material 204, for example. The imaging controller device 110 may process the sample images of the printed material 204 using suitable image processing and recognition techniques, for example to recognize that the printed material 204 is a label web sheet, to identify the labels 208 and the marks 210 on the label web sheet, and to determine the layout information (e.g., such as the layout information (i)-(v) described above or other suitable information) of the label web sheet.

Figure 4:
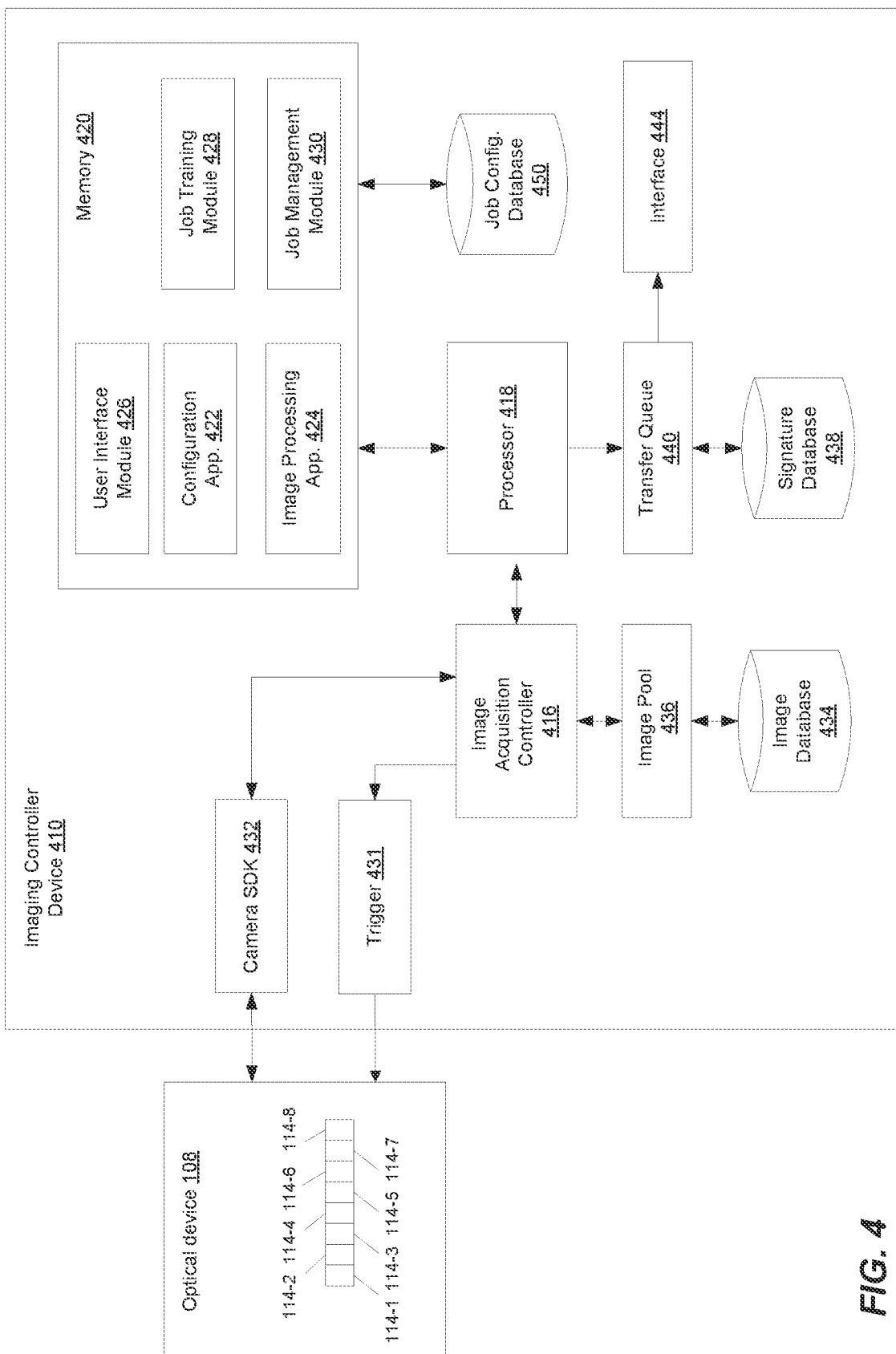
FIG. 4 is a block diagram of an example imaging controller device that may be utilized with the imaging system of FIG. 1, according to an embodiment.

FIG. 4 is a block diagram of an example imaging controller device 410, according to an embodiment. In an embodiment, the imaging controller device 410 corresponds to the imaging controller device 110 of FIG. 1, and the imaging controller device 410 includes like-numbered elements with the imaging controller device 110 that are not discussed for brevity. For example, the imaging controller device 410 includes an image acquisition controller 416, a processor 418, a memory 420 and an interface 444 that correspond, respectively, to the image acquisition controller 116, the processor 118, the memory 120, and the interface 144, in an embodiment. The memory 420 includes a configuration application 422 that corresponds to the configuration application 122 and an image processing application 424 that corresponds to the image processing application 124, in an embodiment. The memory 420 additionally includes a user interface module 426, a job training module 428 and a job management module 430.

In some embodiments, the job training module 428 may determine the specific layout of content on the printed material 104 by applying suitable image processing techniques to one or more sample images that may depict the content of the printed material 104. For example, the job training module 428 may control operation of the optical device 108 during a production run (e.g., during a sample production run or during an initial stage of a real production run) that may be performed by the production apparatus 106, and may acquire sample images of the printed material 104 that may be captured by the cameras 114 during the production run performed by the production apparatus 106. The sample images may capture the entire area of printed material 104, for example. The job training module 428 may process the sample images of the printed material 104 using suitable image processing and recognition techniques, for example to recognize type of content on the printed material 104, and to identify locations of regions of interest on the printed material 104. In some embodiments, the job training module 428 may be omitted from the imaging controller device 410, and the imaging controller device 410 may instead determine information descriptive of the layout of content on the printed material 104 based on user input.

The job management module 430 may be configured to manage various configurations that the imaging controller device 410 may utilize, for example to operate during production runs with different printed material layouts that may be performed by the production apparatus 106. The job management module 430 may store optical system configuration profiles determined based on the different printed material layouts in a job configuration database 450 and may subsequently retrieve appropriate system configuration profiles to configure the imaging controller device 410 for operation during corresponding production runs that may be subsequently performed by the production apparatus 106.

The user interface module 426 may provide various user interfaces for configuring the imaging controller device 410 and/or for monitoring operation of the imaging controller device 410. For example, the user interface module 426 may provide a user interface for obtaining information descriptive of a layout of content on the printed material 104, such as, for example, the user interface 300 of FIG. 3. In some embodiments, the user interface module 426 may provide a user interface that allows the user to select or otherwise specify a particular production run so that a corresponding optical system configuration profile can be retrieved from the job configuration database 450. Additionally or alternatively, the user interface module 426 may provide a user interface for monitoring operation of the imaging controller device 410 during production of the printed material 104, such as monitoring progress of acquiring and processing images by the imaging controller device 410, informing users of any corrupted images acquired by the imaging controller device 410 during production of the printed material, providing alarms to the user, and the like.

The image acquisition controller 416 may include or be directly or indirectly coupled to a trigger device 431 configured to provide control signals to the optical device 108 to control operation of the optical device 108 as described herein. The image acquisition controller 416 may be configured to utilize a camera software development kit (SDK) 432 to communicate with the cameras 114 of the optical device 108 and to acquired images captured by the cameras 114. The image acquisition controller 416 may temporarily store the images acquired from the optical device 108 in an image database 434. The images may then be queued in an image pool 436 for processing by the processor 418. The processor 418 may process the images, and may temporarily store processed images and/or information (e.g., signatures) extracted from the images in a database 438, also referred to herein as a signature database 438. The processed images and/or the information extracted from the images may then be queued in a transfer queue 440 for subsequent transmission via the transfer interface 444.

Figure 5:
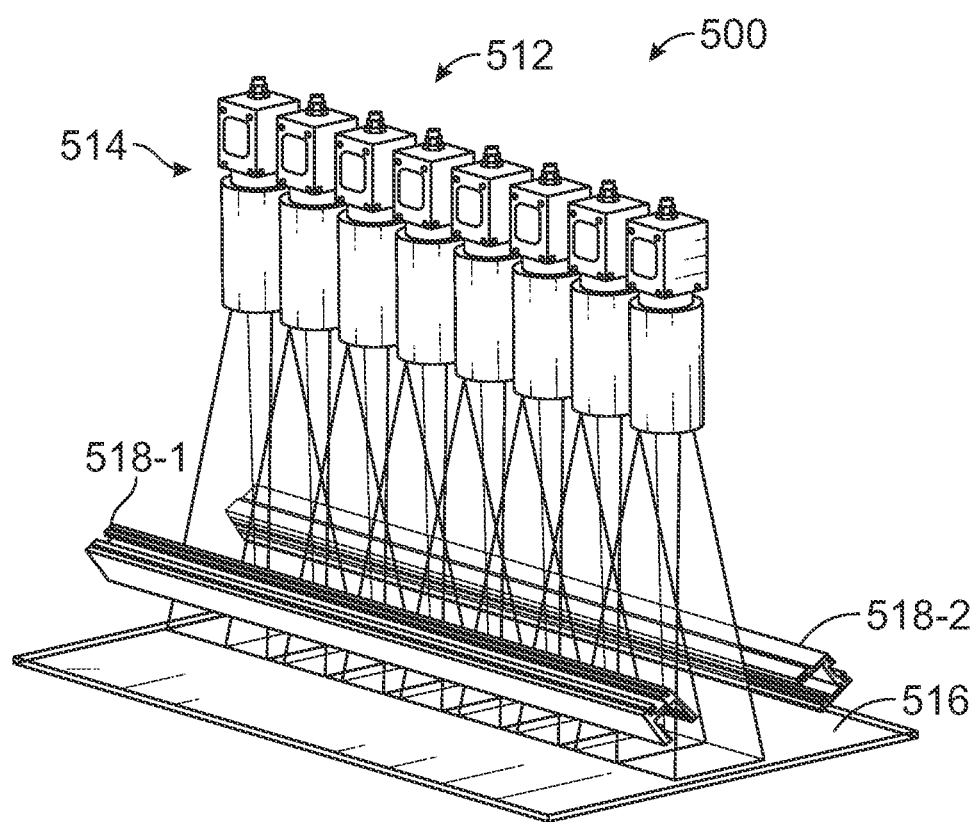
FIG. 5 is a diagram of an example optical device that may be utilized with the imaging system of FIG. 1, according to an embodiment.

FIG. 5 is a diagram of an example optical device 500 that may be utilized as the optical device 108 of FIG. 1, according to an embodiment. The optical device 500 includes a imaging array 512 positioned over a hood 516. The imaging array 512 includes eight cameras 514 that are placed in a linear arrangement, with adjacent pairs of cameras 514 having overlapping fields of view, in the illustrated embodiment. In other embodiments, the optical device 500 includes other suitable numbers of cameras 514 and/or the cameras 514 are arranged in other suitable manners. The optical device 500 additionally includes a plurality of light sources 518, including a first light source 518-1 and a second light source 518-2. The light sources 518 may be high intensity light emitting devices, such as strips of light emitting diodes (LEDs), for example. The light sources 518 may be positioned at 45 degree angles with respect to the surface of the hood 516, with light emitting surfaces pointing towards the fields of view of the cameras 514.

In an embodiment, the imaging controller device 110 control operation of the optical device 500 to trigger the cameras 514 to capture images of the printed material 104 and to acquire images captured by the cameras 514 as described herein. In an embodiment, each time the imaging controller device triggers the cameras 514 to capture an image, the imaging controller device 110 also triggers the light sources 518 to provide a high intensity flash during capture of the images by the cameras 514.

Figure 6:
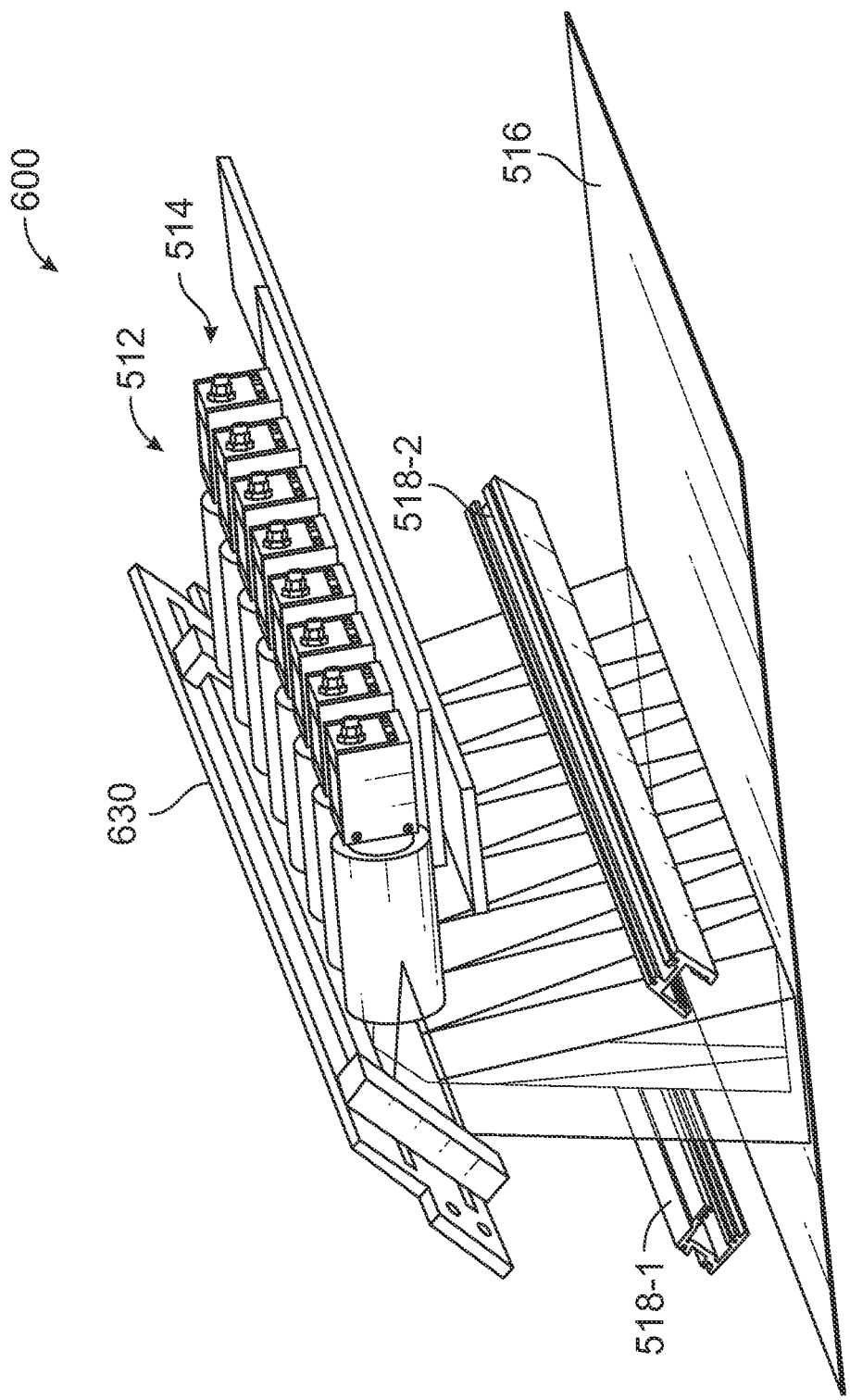
FIG. 6 is a diagram of another example optical device that may be utilized with the imaging system of FIG. 1, according to another embodiment.

FIG. 6 is a diagram of an example optical device 600 that may be utilized as the optical device 108 of FIG. 1, according to another embodiment. The optical device 600 is generally the same as the optical device 500 of FIG. 5, except that the optical device 600 includes a component 630 (e.g., a mirror) having a reflective surface that may be positioned to bend the optical paths of the cameras 514. Because the optical path of the cameras 514 is bent in the optical device 600, the height of the optical device 600 is reduced with respect to the height of the optical device 500, in at least some embodiments. The height reduction may allow use of the optical device 600 in tight areas where limited space may be available in the vicinity of the production apparatus 106, for example, in an embodiment.

Figure 7:
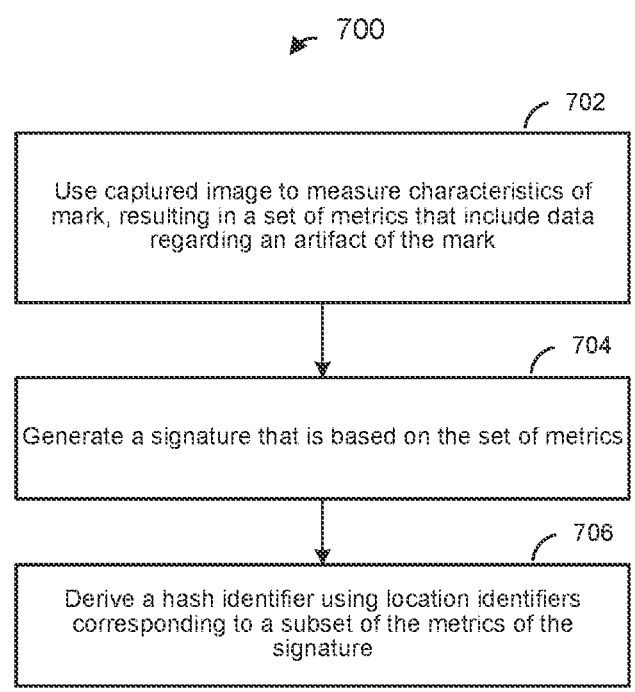
FIG. 7 is a flow diagram of a method for capturing images of printed material that may be implemented in the system of FIG. 1, according to an embodiment.

FIG. 7 is a flow diagram of a method 700 for capturing images of printed material that may be implemented in the system of FIG. 1, according to an embodiment. The method 700 may be implemented by the imaging controller device 110 (e.g., the processor 118) or the imaging controller device 410 (e.g., the processor 418), in example embodiments. For ease of explanation, the method 700 is described in the context of the imaging controller device 110 of FIG. 1. In other embodiments, the method 700 is implemented by suitable devices different from the imaging controller device 110 of FIG. 1.

At block 702, the imaging controller device 110 determines a layout of content on printed material to be produced during production of the printed material by a production apparatus, such as the production apparatus 106. For example, the configuration application 122 determines the layout of the content on the printed material. In an embodiment, the printed material corresponds to the printed material 104 produced by the production apparatus 106 of FIG. 1. In an embodiment, the layout of content on the printed material corresponds to the layout of the label web sheet 202 of FIG. 2, and determination of the layout of the content on the printed material at block 702 is performed as described above with reference to FIG. 2. In other embodiments, determining the layout of content on printed material at block 702 comprises determining layouts of other suitable types of printed material and/or using other suitable determination techniques.

At block 704, the imaging controller device 110 determines, based on the layout of content on the printed material determined at block 702, an optical system configuration profile to be used for controlling an optical device (e.g., the optical device 108, the optical device 500, the optical device 600, or another suitable optical device) during production of the printed material by the production apparatus. In an embodiment, determining the optical system configuration profile at block 704 may include selecting one or more cameras, among the plurality of cameras, for capturing images of one or more regions of interest on the printed material. The one or more cameras may be selected such that each region of interest among the one or more regions of interest fits, in its entirety, in a field of view of a particular camera among the one or more cameras. Determining the optical system configuration profile at block 704 may also determining a trigger interval for triggering the selected one or more cameras.

At block 706, the imaging controller device 110 controls operation of the optical device during production of the printed material by the production apparatus. Controlling operation of the optical device at block 706 includes triggering the one or more cameras selected at block 704 at times determined based on the trigger interval determined at block 704 to capture images of the one or more regions of interest on the printed material as the printed material moves in fields of view of the one or more cameras during production of the printed material, in an embodiment.

The method 700 may additionally include processing the images captured during the production run, for example to generate signature and, in some embodiments HIDs, for marks that may be captured in the images. In an embodiment, an example process for processing the images is described in more detail below with reference to FIG. 8. In other embodiments, other suitable processes are implemented to process the images. In some embodiments, multiple cores and/or multi-threading techniques are utilized to perform parallel processing of the images. In an embodiment, capturing each region of interest on the printed material 104 by a single camera 114 in a single image facilitates parallel processing of images by respective ones of multiple cores and/or using multiple threads because each core and/or thread may independently process a respective entire region of interest captured in a respective image.

Figure 8:
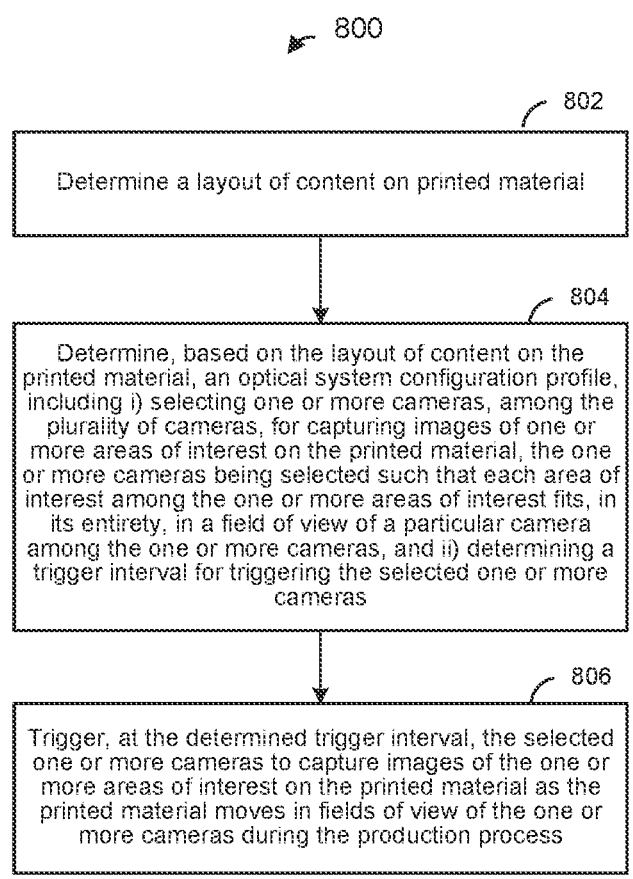
FIG. 8 is a flow diagram of an example process implemented to process captured images in the system of FIG. 1, according to an embodiment.

FIG. 8 is a flow diagram of an example process 800 implemented to process captured images in the system of FIG. 1, according to an embodiment. The image processing application 124 implements the process 800 to process images acquired by the image acquisition controller 116 from the optical device 108 during a production run performed by the production apparatus 106, in an example embodiment.

At block 802, the image processing application 124 may receive an image acquired by the image acquisition controller 116 and may use the acquired image to measure various characteristics of a mark that may be captured in the image. Measuring the various characteristics of the mark may result in a set of metrics that include data regarding artifacts of the mark (e.g., the mark 210). The set of metrics may be one of several sets of metrics that the image processing application 124 generates about the mark. The image processing application 124 may carry out the measurements in different locations on the mark. In doing so, the image processing application 124 can divide the mark into multiple subareas (e.g., in accordance with an industry standard). In an embodiment, if the mark is a 2D barcode, the image processing application 124 carries out measurements on all of or a subset of the total number of subareas (e.g., all of or a subset of the total number of cells) of the mark. Examples of characteristics of the mark that the imaging controller device 110 may measure include: (a) feature shape, (b) feature aspect ratios, (c) feature locations, (d) feature size, (e) feature contrast, (f) edge linearity, (g) region discontinuities, (h) extraneous marks, (i) printing defects, (j) color (e.g., lightness, hue, or both), (k) pigmentation, and (l) contrast variations. In some embodiments, the image processing application 124 takes measurements on the same locations from mark to mark for each characteristic, but on different locations for different characteristics. For example, the image processing application 124 might measure the average pigmentation on a first set of locations of a mark, and on that same first set of locations for subsequent marks, but measure edge linearity on a second set of locations on the mark and on subsequent marks. The two sets of locations (for the different characteristics) may be said to be "different" if there is at least one location that is not common to both sets. In an embodiment, the results of characteristic measuring by the image processing application 124 include a set of metrics. There may be one or more sets of metrics for each of the measured characteristics.

At block 804, the image processing application 124 may analyze the set of metrics measured at block 802 and, based on the analysis, may generate a signature that is based on the set of metrics. Because the set of metrics includes data regarding an artifact (or multiple artifacts) of the mark, the signature will be indirectly based on the artifact. If the mark carries data (as in the case of a 2D barcode), the image processing application 124 may also include such data as part of the signature. Put another way, in some embodiments, the signature may be based on both artifacts of the mark and on the data carried by the mark.

In an embodiment, in order to generate the signature, for each measured characteristic of the mark, the image processing application 124 ranks the metrics associated with the characteristic by magnitude and uses only those metrics that reach a predetermined threshold as part of the signature. For example, the image processing application 124 might refrain from ranking those metrics that are below the predetermined threshold. In an embodiment, there is a different predetermined threshold for each characteristic being measured. One or more of the predetermined thresholds may be based on a noise threshold and on the resolution of the camera 114 that was used to capture the image.

In an embodiment, the image processing application 124 obtains one hundred data points for each characteristic and collects six groups of measurements: one set of measurements for pigmentation, one set of measurements for deviation from a best-fit grid, one set of measurements for extraneous markings or voids, and three separate sets of measurements for edge linearity.

As part of the ranking process, the image processing application 124 may group together metrics that are below the predetermined threshold regardless of their respective locations (i.e., regardless of their locations on the mark). Also, the image processing application 124 may order the metrics (e.g., by magnitude) in each characteristic category as part of the ranking process. Similarly, the image processing application 124 might simply discount the metrics that are below the predetermined threshold. Also, the process of ranking may simply constitute separating metrics that are above the threshold from those that are below the threshold.

In an embodiment, the image processing application 124 orders the measured characteristics according to how sensitive the characteristics are to image resolution issues. For example, if the cameras 114 of the optical device 108 do not have the capability to capture an image in sufficiently high resolution, it might be difficult for the image processing application 124 to identify non-linearities of edges. However, the image processing application 124 may have no problem identifying deviations in pigmentation. Thus, the image processing application 124 might, on this basis, prioritize pigmentation over edge non-linearities. According to an embodiment, image processing application 124 orders the measured characteristics in reverse order of resolution-dependence as follows: subarea pigmentation, subarea position bias, locations of voids or extraneous markings, and edge non-linearities.

According to an embodiment, the image processing application 124 weights the measured characteristics of the mark based on one or more of the resolution of the cameras 114 of the optical device 108 and the resolution of the captured image of the mark. For example, if the resolution of the cameras 114 is low, then the image processing application 124 may give more weight to the average pigmentation of the various subareas of the mark. If the resolution of cameras 114 is high, then the image processing application 124 may give measurements of the edge irregularities of various subareas higher weight than other characteristics. If the mark includes error-correcting information, such as that set forth by ISO/IEC 16022, then the image processing application 124 may use the error-correcting information to weight the measured characteristics. For example, the image processing application 124 could read the error-correcting information, use the error-correcting information to determine which subareas of the mark have errors, and under-weight the measured characteristics of such subareas.

At block 806, the image processing application 124 may use location identifiers corresponding to a subset of the metrics of the signature to derive a hash identifier (HID). In one embodiment, the image processing application 124 uses index numbers corresponding to a subset of the highest-magnitude metrics of the signature to derive an HID. In some embodiments, the image processing application 124 may, in deriving the HID, use index numbers corresponding to a subset of each set of metrics as a block within an overall HID.

The imaging controller device 110 may transmit the signature and the HID via the interface 144 and the communication network 150 to the server device 140 and/or the database 152 such that the HID is associated with the signature. In some embodiments, the HID can also be used to look up the signature (e.g., the server device 140 uses a database program to set the HID as an index key for the signature).

Figure 9:
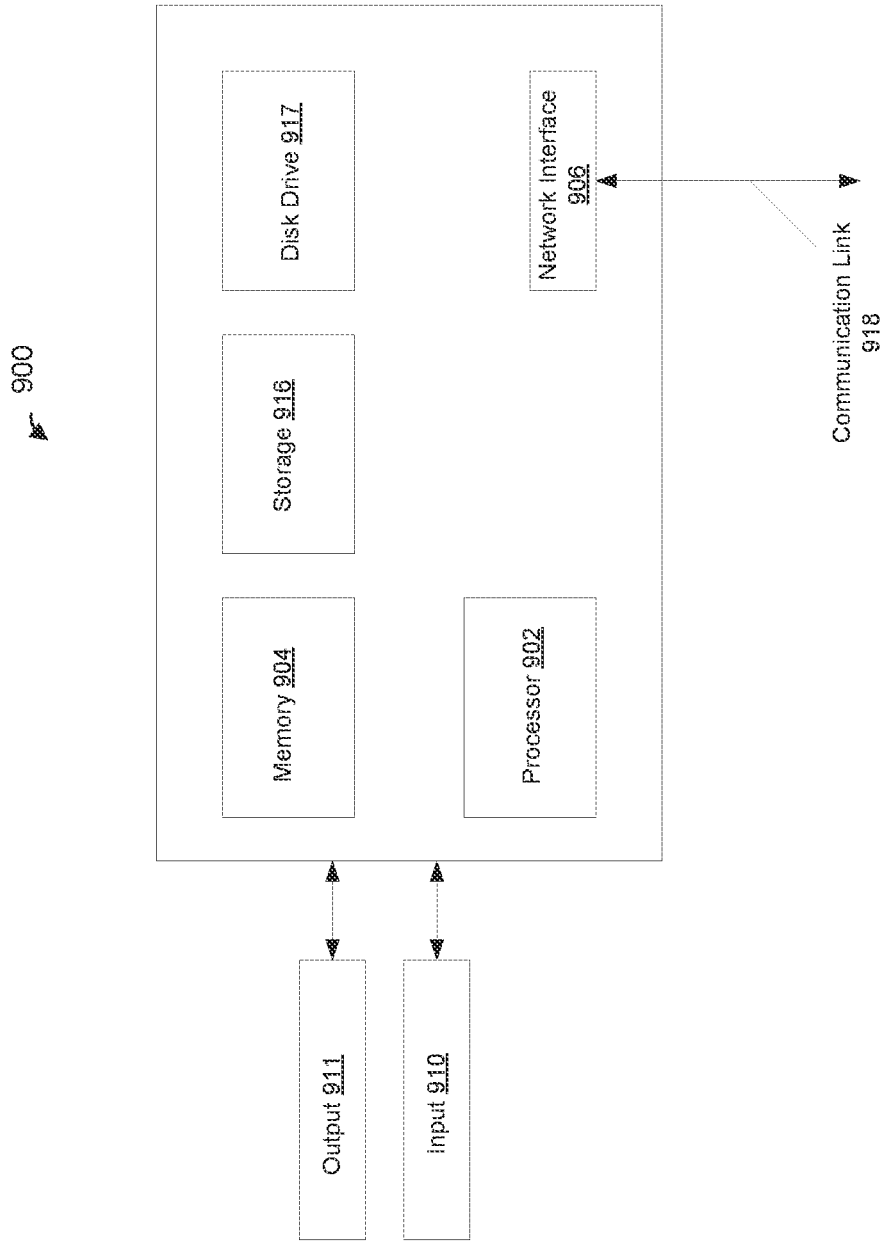
FIG. 9 is a block diagram of a computer system suitable for implementing one or more components of the system of FIG. 1, according to an embodiment.

FIG. 9 is a block diagram of a computer system 900 suitable for implementing one or more components of the system of FIG. 1, according to an embodiment. In its most basic configuration, the computer system 900 may include at least one processor 902 and at least one memory 904. The computer system 900 may also include a bus (not shown) or other communication mechanism for communicating information data, signals, and information between various components of computer system 900. Components may include an input component 910 that processes a user action, such as selecting keys from a keypad/keyboard, selecting one or more buttons or links, etc., and sends a corresponding signal to the at least one processor 902. Components may also include an output component, such as a display, 911 that may display, for example, results of operations performed by the at least one processor 902. A transceiver or network interface 906 may transmit and receive signals between the computer system 900 and other devices, such as user devices that may utilize results of processes implemented by the computer system 900. In one embodiment, the transmission is wireless, although other transmission mediums and methods may also be suitable.

The at least one processor 902, which can be a microcontroller, digital signal processor (DSP), or other processing component, processes these various signals, such as for display on the computer system 900 or transmission to other devices via a communication link 918. The at least one processor 902 may also control transmission of information, such as cookies or IP addresses, to other devices. The at least one processor 902 may execute computer readable instructions stored in the memory 904. The computer readable instructions, when executed by the at least one processor 902, may cause the at least one processor 902 to implement processes associated with video frame processing and/or recognition of a subject based on a plurality of video frames.

Components of the computer system 900 may also include at least one static storage component 916 (e.g., ROM) and/or at least one disk drive 917. Computer system 900 may perform specific operations by processor 912 and other components by executing one or more sequences of instructions contained in system the memory 904. Logic may be encoded in a computer readable medium, which may refer to any medium that participates in providing instructions to the at least one processor 902 for execution. Such a medium may take many forms, including but not limited to, non-transitory media, non-volatile media, or volatile media, and transmission media. In various implementations, non-volatile media includes optical or magnetic disks, volatile media includes dynamic memory, such as system memory component 914, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

When implemented in hardware, the hardware may comprise one or more of discrete components, an integrated circuit, an application-specific integrated circuit (ASIC), a programmable logic device (PLD), etc.

While various operations have been described herein in terms of "modules" or "components," it is noted that that terms are not limited to single units or functions. Moreover, functionality attributed to some of the modules or components described herein may be combined and attributed to fewer modules or components. Further still, while the present disclosure refers to specific examples, those examples are intended to be illustrative only, and are not intended to be limiting in scope. It will be apparent to those of ordinary skill in the art that changes, additions and/or deletions may be made to the disclosed embodiments without departing from the spirit and scope of the present disclosure. For example, one or more portions of methods described above may be performed in a different order (or concurrently) and still achieve desirable results

What is claimed is:

1. A system for capturing images during production of printed material, the system comprising:
    an optical device comprising a plurality of cameras arranged in an array, wherein adjacent pairs of cameras in the array have overlapping fields of view; and
    an imaging controller device configured to:
        determine a layout of content on printed material,
        determine, based on the layout of content on the printed material, an optical system configuration profile, including i) selecting one or more cameras, among the plurality of cameras, for capturing images of one or more regions of interest on the printed material, the one or more cameras being selected such that each region of interest among the one or more regions of interest fits, in its entirety, in a field of view of a particular camera among the one or more cameras, and ii) determining a trigger interval for triggering the selected one or more cameras, and
        trigger the selected one or more cameras at times determined based on the trigger interval to capture images of the one or more regions of interest on the printed material as the printed material moves in fields of view of the one or more cameras during production of the printed material.

2. The system of claim 1, wherein the imaging controller device is configured to determine the layout of content on the printed material based on user input.

3. The system of claim 1, wherein the imaging controller device is configured to determine the layout of content on the printed material based on processing one or more sample images of the printed material.

4. The system of claim 1, wherein the plurality of cameras is arranged in a linear array of cameras with overlapping fields of view.

5. The system of claim 1, wherein
    the optical device further comprises one or more light emitting devices, and
    the imaging controller device is further configured to trigger, at the determined trigger interval, the one or more light emitting devices to produce flashes of light during capture of the images.

6. The system of claim 1, wherein the optical device further comprises a reflective surface configured to bend optical paths of the plurality of cameras to reduce a height dimension of the optical device.

7. The system of claim 1, wherein the imaging controller device is further configured to
    receive sensor signals generated by a sensor, the sensor signals indicating reference points on the printed material during production of the printed material,
    receive, encoder signals generated by an encoder, the encoder signals tracking motion of the printed material during production of the printed material, and
    trigger the selected one or more cameras at times determined further using the sensor signals and the motion signals.

8. The system of claim 1, wherein the imaging controller device comprises one or more processors configured to process the captured images.

9. The system of claim 8, wherein the one or more processors are configured to process the captured images to detect defects for quality control in production of the printed material.

10. The system of claim 9, wherein the imaging controller device is further configured to transmit, over a network to a server device, one or both of i) the captured images and ii) electronic signatures generated based on the captured images.

11. The system of claim 8, wherein:
the one or more regions of interest on the printed material include printed marks, and
the one or more processors are configured to process the captured images to generate electronic signatures for the printed marks, the electronic signatures to be subsequently used for authenticating the printed marks.

12. The system of claim 1, wherein the imaging controller device is further configured to store, in a memory, the optical system configuration profile for use during production of the printed material.

13. The system of claim 12, wherein the imaging controller device is further configured to
select the optical system configuration profile from among a plurality of optical system configuration profiles stored in the memory, and
in response to selecting the optical system configuration profile, retrieve the optical system configuration profile from the memory for use during production of the printed material.

14. A method for capturing images of printed material by an optical device equipped with a plurality of cameras arranged in an array, wherein adjacent pairs of cameras in the array have overlapping fields of view, the method comprising
determining, with a processor of an imaging controller device, a layout of content on printed material;
determining, with the processor of the imaging controller device based on the layout of content on the printed material, an optical system configuration profile, including i) selecting one or more cameras, among the plurality of cameras, for capturing images of one or more regions of interest on the printed material, the one or more cameras being selected such that each region of interest among the one or more regions of interest fits, in its entirety, in a field of view of a particular camera among the one or more cameras, and ii) determining a trigger interval for triggering the selected one or more cameras; and
triggering, with the imaging controller device, the selected one or more cameras at times determined based on the trigger interval to capture images of the one or more regions of interest on the printed material as the printed material moves in fields of view of the one or more cameras during production of the printed material.

15. The method of claim 14, wherein determining the layout of content on the printed material comprises determining the layout of content on the printed material based on user input.

16. The method of claim 14, wherein determining the layout of content on the printed material comprises determining the layout of content on the printed material based on processing one or more sample images of the printed material.

17. The method of claim 14, wherein:
the optical device further comprises one or more light emitting devices, and
the method further comprises triggering, with the imaging controller device at the determined trigger interval, the one or more light emitting devices to produce flashes of light during capture of the images.

18. The method of claim 14, wherein:
the method further comprises
receiving, at the processor of the imaging controller device, sensor signals indicating reference points on the printed material during production of the printed material,
receiving, at the processor of the imaging controller device, encoder signals tracking motion of the printed material during production of the printed material, and
triggering the selected one or more cameras comprises triggering the selected one or more cameras at times determined using the sensor signals and encoder signals.

19. The method of claim 14, further comprising processing, with the processor of the imaging controller device, the captured images to detect defects for quality control in production of the printed material.

20. The method of claim 14, wherein
the one or more regions of interest on the printed material include printed marks, and
the method further comprises processing, with the processor of the imaging controller device, the captured images to generate electronic signatures for the printed marks, the electronic signatures to be subsequently used for authenticating the printed marks.

* * * * *